Dec. 31, 1946.  F. E. HUMMEL  2,413,500

LAMINATED STRUCTURE

Filed Jan. 22, 1945

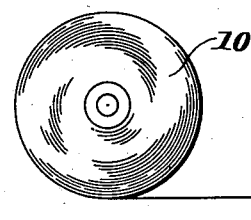

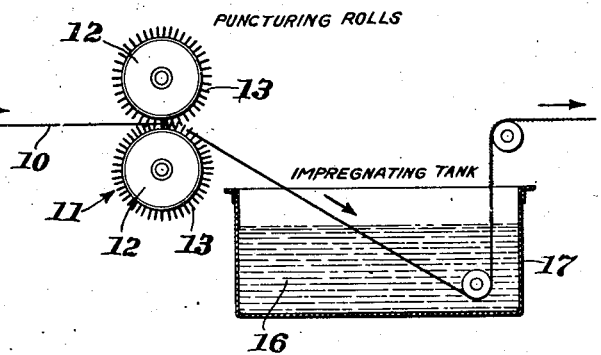

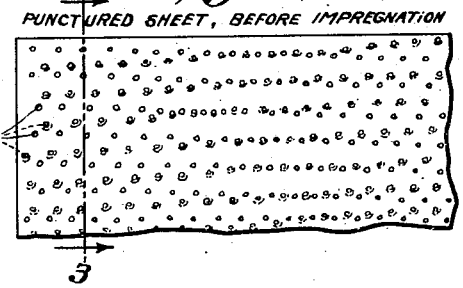

Fig. 2.
PUNCTURED SHEET, BEFORE IMPREGNATION

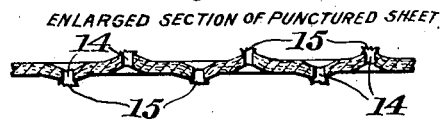

Fig. 3.
ENLARGED SECTION OF PUNCTURED SHEET

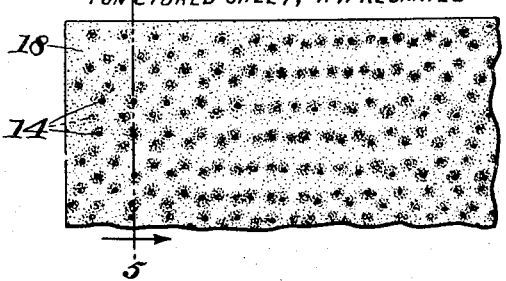

Fig. 4.
PUNCTURED SHEET, IMPREGNATED

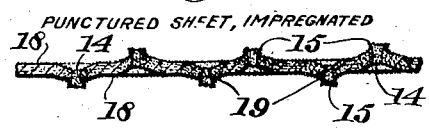

Fig. 5.
PUNCTURED SHEET, IMPREGNATED

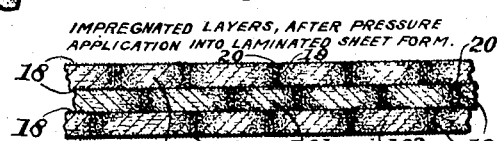

Fig. 7.
IMPREGNATED LAYERS, AFTER PRESSURE APPLICATION INTO LAMINATED SHEET FORM.

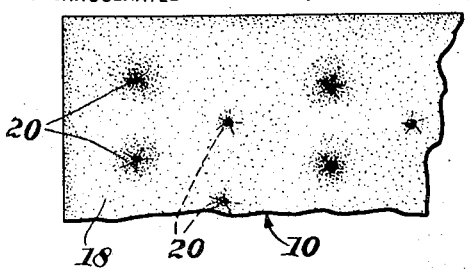

Fig. 6.
EXAGGERATED FACE VIEW, AFTER PRESSURE

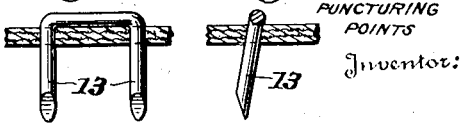

Fig. 8.  Fig. 9.
PUNCTURING POINTS

Inventor:
Fred E. Hummel,
By Cushman Darby & Cushman
Attorneys.

Patented Dec. 31, 1946

2,413,500

UNITED STATES PATENT OFFICE 2,413,500

LAMINATED STRUCTURE

Fred E. Hummel, Hopewell, Va., assignor to Hummel-Ross Fibre Corporation, Hopewell, Va., a corporation of Virginia Application January 22, 1945, Serial No. 573,982

1 Claim. (Cl. 154—43)

The present invention relates to a laminated paper structure in which the laminae are coated or saturated and built up into a flexible structure or rigid board suitable for building materials, sealing materials and numerous other uses.

The principal difficulty experienced with laminated papers has been their tendency to delaminate, and it is the primary object of the invention to overcome this objection by creating a multitude of high concentration adhesive areas and associated roughened areas in the paper layers, which areas form barriers to delamination.

A further object of the invention is to effectively reduce customary flow of the liquid treating material to the edges of the paper, whereby a greater amount is retained within the sheet and so held that it does not exude in the laminating operation.

The lamination of punched out sheets and their adhesion by means of a resinous adhesive is known and this invention is an improvement over such earlier methods and products.

The improvement consists in puncturing the paper at a multiplicity of closely spaced points, but without removing the displaced paper material so that a burr of highly absorbent paper stock remains integral with the wall of each hole or puncture at the surface of the sheet.

I find upon subsequent coating or impregnation that the resinous adhesive not only fills the holes and enters the wall portions thereof, but, particularly, is absorbed into the adjacent burr portions of the holes. Sheets prepared in this manner have adhesive films on opposite faces and much higher concentrations of adhesive at and about the myriad of puncture points where the column of adhesive extending through the holes integrally connects the coating films. The sheet is stronger than originally and particularly exhibits greatly improved Mullen strength.

More important, when such sheets are superposed for lamination, the high concentration of adhesive at and about the points of puncture coupled with the irregular surface produced by each burr gives such an improved union of the layers, i. e., form delaminating barriers, that delamination or peeling is, for all practical purposes, eliminated.

Thus, by puncturing without removal of stock, as distinguished from customary punching out with removal of stock by a clean cut opening, I am enabled to have increased concentrations of adhesive substantially throughout each lamination and at the same time afford a better adhesive gripping of the layers due to the roughened surfaces presented by the multiplicity of burrs.

The burrs furthermore act to absorb adhesive and retain it in the sheet so that flow toward the edges is arrested and exudation in the laminating operation is avoided.

Referring to the drawing:

Fig. 1 illustrates the method of puncturing the paper from opposite sides and impregnating or coating the same as a continuous web.

Fig. 2 is a fragmental plan view of a length of the paper before the adhesive application and showing the burrs.

Fig. 3 is an enlarged section on the line 3—3 of Fig. 2.

Fig. 4 is a fragmental plan view of a length of the paper after adhesive treatment.

Fig. 5 is an enlarged section on line 5—5 of Fig. 4 and showing the burrs which have now absorbed considerable adhesive.

Fig. 6 is a fragmental plan view showing the coated sheet and the irregular gripping surfaces at the punctures.

Fig. 7 is a further enlarged sectional view of a laminated structure, and

Figs. 8 and 9 are views partly in section of the puncturing means.

It is to be understood that the invention is operable with various types of papers, but preferably a quality is used which is readily impregnated or saturated by the coating material or adhesive.

THE PROCESS

Step 1

Referring to Fig. 1, a roll of paper 10 is provided from which a strip is continuously fed to the puncturing device 11. Preferably, this device consists of rolls 12 each carrying pointed puncturing means 13 as shown in Figs. 8 and 9. The puncturing means are disposed throughout the surfaces of the rolls so as to form a multiplicity of holes or punctures 14, as shown in Fig. 3 from each side of the strip. The material displaced by the puncturing means is retained integrally about each hole in the form of a burr 15 as shown in Fig. 3. In some cases, the puncturing may be from one side only. Also, other types of pointed puncturing means may be utilized so long as they do not sever any substantial amount of the displaced stock and form the burr-like projection 15. Preferably, the puncturing means are closely spaced to form a myriad of holes and burrs throughout the travelling web.

Step 2

The strip having the form shown in Fig. 3 is now passed through a liquid material 16 contained in a tank 17, as shown in Fig. 1. In this manner, coating or impregnation of the strip is accomplished forming surface films 18 and the product shown in Fig. 5. Referring to Fig. 5, the liquid penetrates the holes 14 to fill each hole as a continuous column 19 integral with the films 18. Also, the liquid is absorbed into the walls of the holes and of particular importance, the liquid is absorbed by and flowers out into the burrs 15 and is retained therein whereby flow toward the edges of the strip is prevented and an increased concentration is assured in the sheet at and about each of the myriad of closely spaced holes and burrs.

The liquid coating or impregnant may be any usual coating material or adhesive, preferably a synthetic resin, such as a urea-formaldehyde resin, a phenol-pormaldehyde resin, a polyvinyl acetal resin, or an alkyd resin. The resins may be of the cold setting, thermoplastic or thermosetting character and of the low pressure or high pressure types. In lieu of synthetic resins, asphalt as well as vegetable and animal base adhesives and saturants may be used. A dye or pigment may be included in the bath 16 if desired.

In passing through the tank 17, the strip may be simply coated on each surface or it may be impregnated or saturated to any desired extent. In any case, the columns 19 are formed and the treating material is absorbed by the walls of the holes, and particularly by the burrs 15 as described.

The strip may pass from the tank 17 to a drier (not shown), and then be rewound, or it may be dried and severed into suitable lengths or sheet sizes. The strip may be severed while wet and the lengths then dried or the lengths while still wet may be employed, for example to produce a built-up structure as shown in Fig. 7. The manner of drying and severing described will depend on the character of resin employed, and also whether the coated or saturated material is to be immediately used.

Step 3

Referring to Fig. 7, suitable lengths of the treated strip are superposed. Usually a pressure is employed to unite the layers and in some cases dependent on the resin both heat and pressure are employed. The laminating conditions, in addition to being dependent on the resin, are also controlled in accordance with the density and flexibility or stiffness of the final paper product or board desired.

THE PRODUCT

The final product is shown in Figs. 6 and 7.

In Fig. 6, a single length or thickness of paper 10 made according to Fig. 5 has been rolled or flattened. This sheet whether impregnated or coated has films 18 on each surface connected integrally by columns 19 of the film or saturating material, which columns continuously extend in the holes 14 through the thickness of the sheet and integrally unite the films 18. The burrs 15 containing absorbed coating or impregnating material are flattened back as shown at 20 and form roughened areas whereby, in a laminated product, these roughened areas, not only provide for greatly increased adhesive concentration, but also assure a tight union of the laminations since the adhesive bonds tighter to a roughened surface.

In Fig. 7, the superposed laminations or layers 10, $10^1$, $10^2$, are pressed together into a unit. It will be noted that the adhesive in the columns 19 and the adhesive in the associated burrs 15 are not only integral with the adhesive films 18 on the surfaces of the particular layers in which they are disposed, but are integral also with the films 18 on the surfaces of adjacent layers whereby integral adhesive connections throughout the thickness of the laminated product are obtained at a multiplicity of points. The adhesive films 18 of adjacent layers unite or merge into a single integral adhesive stratum between the layers, and this is likewise true of the adhesive at and about the punctures, i. e., it unites with the adhesive film of an adjacent layer or with the adhesive at and about punctures in said adjacent layer where the punctures line up. The roughened portions 20 materially aid the adhesive union of the layers and a structure is formed which has the strongest resistance to delamination at and about the punctures. These points of roughness and greatest adhesive concentration being in closely spaced relation throughout the areas of the sheets act as barriers to preclude delamination or peeling in a highly improved manner.

As many layers as desired may be incorporated in the laminated structure, and the saturant or coating material in addition to being an adhesive, may also impart water resistance to the paper. In this connection, the burrs 15 by reason of their absorbency and function of retarding flow of the coating toward the edges improve the water resistance factor by assuring that an increased amount of the coating or saturant will be present in the sheet. Moreover, by reason of this action of the burrs, exudation of resin from and between the layers under pressure or heat and pressure is eliminated.

I claim:

A structure having a laminated body formed from layers of paper united by films of adhesive, each layer having a multiplicity of closely spaced holes formed from opposite sides of the paper and extending through each of said layers and arranged substantially throughout the areas thereof, the paper material displaced by forming said holes being split about the said holes and the split portions being integrally retained about the openings and forming flattened roughened areas, whereby the adhesive extends as columns through said holes and is absorbed into the walls thereof and into the said displaced paper material so that said layers at and about said holes have the greatest concentration of adhesive, such high adhesive concentrations and flattened roughened areas producing a multiplicity of adhesive unions throughout the areas of the layers which act as barriers to prevent delamination of the layers.

FRED E. HUMMEL.